(12) United States Patent
Bill

(10) Patent No.: US 6,171,460 B1
(45) Date of Patent: Jan. 9, 2001

(54) CHEMICALLY PROTECTED ELECTRODE SYSTEM

(76) Inventor: John L. Bill, 427 Pine Glen La., Apt. B-1, Greenacres, FL (US) 33416

( * ) Notice: Under 35 U.S.C. 154(b), the term of this patent shall be extended for 0 days.

(21) Appl. No.: 09/225,151

(22) Filed: Jan. 4, 1999

Related U.S. Application Data

(63) Continuation-in-part of application No. 08/612,561, filed on Mar. 8, 1996, now abandoned, which is a continuation of application No. 08/060,821, filed on May 10, 1993, now abandoned.

(51) Int. Cl.$^7$ ................................................ C25B 11/04
(52) U.S. Cl. ........................... 204/291; 204/294; 429/41; 429/42; 429/45
(58) Field of Search ........................... 204/291, 294, 204/290.12, 290.14, 290.15; 429/41, 42, 45; 501/134

(56) References Cited

U.S. PATENT DOCUMENTS

| | | |
|---|---|---|
| 4,287,032 * 9/1981 | Pellegri | 204/294 |
| 4,435,313 * 3/1984 | Katy et al. | 429/42 |
| 4,572,870 * 2/1986 | Vasta | 428/416 |
| 4,892,786 * 1/1990 | Newkirk | 428/307.3 |
| 4,933,230 * 6/1990 | Card et al. | 428/242 |
| 5,173,215 * 12/1992 | Clarke | 501/134 |
| 5,776,637 * 7/1998 | Kashio et al. | 427/217 |

* cited by examiner

Primary Examiner—Bruce F. Bell

(57) ABSTRACT

Conductive ceramics are useful in the construction of electrochemical electrodes that are used in a wide variety of applications because of their inherent chemical resistance. When porous forms of these ceramics are employed as electrodes in even dilute corrosive solutions, corrosive ionic species are caused to diffuse from the solutions into the porous electrode and to concentrate in the vicinity of the electrical connection by means of electromigration. The resulting corrosive degradation of the electrode and the electrical connection ultimately causes electrical failure. The present invention uses polymers to impregnate and selectively coat the ceramic so as to create a barrier seal against the migration of corrosives into the electrode while allowing the ceramic electrode to maintain electrical contact with its environment. Methods for achieving such impregnation are disclosed.

22 Claims, 10 Drawing Sheets

CHEMICALLY PROTECTED ELECTRODE SYSTEM

REFERENCE TO RELATED APPLICATION

This case is a continuation-in-part of application Ser. No. 08/612,561, filed Mar. 8, 1996, now abandoned which is a continuation-in-part of application Ser. No. 08/060,821, filed May 10, 1993, now abandoned.

BACKGROUND OF THE INVENTION

This invention relates to improved ceramic electrodes and more particularly to the chemical protection of ceramic electrodes by coating and infiltrating with polymers.

Background—Description of the Prior Art

A new class of composite materials is that which combines ceramics with polymers. Typically, the chemically disparate ceramic and polymer components are combined in powdered form prior to heating, implosive compaction, or other form of processing. U.S. Pat. No. 4,146,525 to Stradley discloses a composite material formed by low temperature fusing of finely divided ceramic powders and a powdered polymer such as epoxy. U.S. Pat. Nos. 4,726,099 and 4,933,230 to Card, et. al. discuss creation of fiber layers of piezoelectric ceramic that are subsequently immersed in polymer. U.S. Pat. No. 5,109,080 to Wang, et. al. discloses an optically transparent composite formed from a combination of refractive index-matched ceramic and polymer. The composite material is formed by sol-gel synthesis of a metal alkoxide and an alkoxysilane polymeric component. In contrast to these methods of forming ceramicpolymer composites, the subject of the present invention pertains to the polymer impregnation of the porous structure of a previously formed ceramic article. In the formation of ceramics that preclude the initial combination of ceramic and polymer materials, impregnation of bulk porous ceramic with the polymer must indeed be pursued. Recently, Vipulanandan, et. al.[1] have successfully fabricated a thermoplastic polymer (polymethylmethacrylate) impregnated ceramic. The uncured polymer had a viscosity less than that of water and was simply "poured into" the ceramic. The ceramic was a high temperature superconductor and impregnation was for the purpose of increasing the mechanical strength of the ceramic. Low and Lim[2] have impregnated a $YBa_2Cu_3O_{7-x}$ superconductor using an epoxy resin with curing agent. A thesis by Lim[3] discusses the protection afforded by the epoxy to aqueous phase decomposition of the ceramics in water, acid or alkali. The work of Vipulanandan, et. al. and Lim and Low does not address the impregnation of ceramics of small pore size. Their work does not make use of impregnation liquids having high viscosity. In many applications, the salient feature of the impregnation liquid may be resistance to chemical attack and low viscosity versions of these liquids may be unavailable.

U.S. Pat. No. 4,892,786 to Newkirk discloses a method of making a composite material by reacting a molten metal with an oxidant to form a porous non-sintered ceramic and then infiltrating the ceramic with a polymer. Newkirk teaches a polymer infiltration process used with this non-sintered ceramic having a mean pore size on the order of 25 microns. The ceramic was first surrounded with polymer liquid then iteratively exposed to one half atmosphere of air pressure in an effort to withdraw air entrapped within the ceramic and then one atmosphere of air pressure to cause infiltration of the polymer into the ceramic. There are a number of reasons why the method disclosed by Newkirk will in general not be applicable in the case of viscous polymer-forming liquids with ceramics having small (microns or smaller) or even moderate pore sizes (tens of microns). The reasons are both physical and chemical as described next.

The flow rate of a viscous liquid through a porous material is approximated by Poiseuille's equation:

$$Q/A = (\pi \Delta p / 8 \mu \delta) \Sigma d_i^4$$

where Q/A is the volumetric flow rate per unit area of material, $\Delta p$ is the pressure drop across the slab of material, $\mu$ is the liquid viscosity, $\delta$ is the slab thickness, and $d_i$ represents the individual pore diameters within the area A. As is shown by the above equation, flow rate at a given pressure is proportional to the fourth power of pore diameter. Therefore, ceramics with small pore sizes require extreme overpressures to achieve impregnation in reasonable times. As an example, using a polymer-forming liquid with a relatively low viscosity of 200 centipoises for impregnation of a centimeter thickness of ceramic having a mean pore diameter of 1 micron will require close to 1500 psi of pressure to achieve impregnation within an hour's time. Hence, the viscosity of most polymer-forming liquids will require significant overpressure to achieve impregnation of moderate pore size ceramics in practical manufacturing timeframes. Additionally, for curing techniques that elevate the polymer precursor and ceramic temperatures, residual air that would remain in the ceramic in the process disclosed by Newkirk would ultimately cause oozing of the polymer from the porosity. This would be caused by expansion of entrapped air. Such residual air can also cause secondary porosity as air bubbles migrate to external ceramic surfaces and form channels within the polymer. Other contaminants are adsorbed into the surface of the ceramic and may require heating for removal. An example is that of water which is adsorbed by most metal oxide ceramics; if the adsorbed water is not removed it can interfere with the polymer activating agents. Finally, the overpressure should be provided by a "chemically inert" gas. This would not necessarily be a noble gas such as argon, but a gas that would not react with the polymer or the ceramic host—for example dry nitrogen may be acceptable for many situations. An example of the deleterious effects caused by a chemically active pressurizing gas is the improper curing of polymer precursors such as polyester formulations. Many of these use oxidizing activators; hence, premature curing will ensue as the polymer precursor is exposed to oxygen if the pressurizing gas is air.

Among the categories of ceramics that invite the use of polymer impregnation are electrically conductive (EC) ceramics used in electrode applications[4]. Electrically conductive ceramic electrodes are applicable to magnetohydrodynamic (MHD) systems, fuel cells, electro-remediation of soils and groundwater, batteries, cathodic protection systems, electrostatic discharge systems, and electrochemical cells. Electrochemical cells are useful in the chemical breakdown of compounds, electrolysis; the refining and production of metals, electrowinning; creation of compounds, electosynthesis; and the separation of chemical species in aqueous solution; electrodialysis. A prime motive for the selection of ceramic electrodes for use in electrochemical cells is the improvement in corrosion resistance offered by these materials over metals and carbon. An example of one such chemically resistant ceramic is variable stoichiometry titanium oxide. Given the relative chemical resistance of such sintered ceramics, porosity of these materials remains problematic for many electrode applications. Migration of corrosive agents into the porous voids can degrade the lifetime of a given ceramic electrode. When in operation, the ceramic admits the influx of corrosive chemical species that may be present in given electrolyte solutions. Non-ionic corrosives will diffuse into the electrode, however corrosive ionic species, by virtue of electomigration can achieve concentrations in the bulk of the electrode material that are well above corresponding concentrations in the electrolyte external to the electrode. The tendency for these ionic species to concentrate (due to electromigration) in the proximity of the metal conductor connection to the ceramic electrode can dramatically reduce the lifetime of the electrical connection. Furthermore, high concentrations of the ionic corrosive in the bulk of the ceramic electrode can degrade the chemical and structural integrity of the ceramic. It is a purpose of the present invention to provide chemical protection to porous ceramic electrodes by means of impregnating materials in order to significantly extend the operational lifetime of this class of electrodes.

Prior art methods for providing electrodes in general with improved chemical resistance include physical-chemical treatment of the electrode surface, chemical treatment of the electrode bulk material, and the use of EC ceramic or polymer coatings. U.S. Pat. No. 4,435,313 to Katz, et. al. discloses a method of manufacturing an electrode having a titanium base with intermediate protective polymer coatings and an exterior manganese or lead dioxide coating. U.S. Pat. No. 4,314,231 to Walty discloses an electrode comprising a conductive mesh bonded to an electrode, the entirety of the geometry coated with a conductive polymer. U.S. Pat. No. 4,017,663 to Breault describes a pyrolytic carbon coated, hydrophobic polymer impregnated carbon paper having a catalyst-hydrophobic polymer exterior coating. U.S. Pat. No. 4,572,870 to Vasta discloses a polymer coating comprising chlorosulfonated ethylene vinyl acetate polymer, epoxy resin, a polyamine curing agent, and a bicyclic amidine. When pigmented with EC pigments, the cured coating provides protection to metal electrodes used in electrochemical reactions. U.S. Pat. No. 4,337,139 to Gestaut, et. al. discloses an electrode made from a catalyst containing, partially fluorinated carbon particles that resist corrosion. These citations of prior art do not address impregnation of the porous volumes of ceramics with polymers.

A ceramic electrode can be used as an anode or a cathode in an electrochemical cell and thus may be exposed to either a caustic or acidic environment. In general, metals or metal alloys can be selected for use as cathode material that will survive in caustic environments. These materials are generally unsuitable for use as anode materials in highly acidic environments.

The use of electrodialysis cells for removal of heavy metals from metal finishing rinses often results in high concentrations of oxidizing inorganic acids such as nitric, hydrochloric, hydrofluoric, and fluoboric acid, etc., in the anode compartment of the cell. The free radicals of these acids exist as anions in aqueous solutions and electromigrate toward the anode. There are certain combinations of these acids in which no metal will survive as an anode for more than a few weeks, days or hours, depending upon the combination and concentration of the acids. Perhaps the most severe case involves the recovery of hexavalent chromium from the rinse water of a simple chromate conversion coating bath for aluminum. The pH of the bath is maintained within a range between 1.7 to 1.9 with by addition of nitric acid as the bath is used. Additionally, it is common for metal finishing shops to use potable water for rinsing operations and makeup water in the baths due to the water lost upon removal of plating work from the bath. This water contains chlorine in almost all cases. Under these circumstances, a mixture of hydrochloric and nitric acids is present. This combination, known as aqua regia, dissolves gold and other precious metals.

In addition to this corrosive combination, the fluoride ion is present, the most electronegative and hence strongest oxidizer known to man. Fluorine compounds are widely used as mixed catalysts in chrome plating baths. The fluoride ion is introduced in chromate conversion baths by use of the catalyst ammonium silicofluoride. As an example of the vigor with which these baths attack electrodes, platinum-clad niobium anodes can be destroyed in two weeks at current densities of 160 milliamps/in$^2$.

Conductive ceramics such as variable stoichiometry titanium oxide will survive in this environment much longer than metals as long as the concentration of hydrofluoric acid remains below 2 percent. This material will also resist phosphoric acid attack as long as the acid solution is not boiling and remains unconcentrated. Experiments conducted with polymer impregnation of only a region of a variable stoichiometry titanium oxide anode immersed in a chromate conversion solution have resulted in destruction of the unprotected regions of the variable stoichiometry titanium oxide. Again, the porosity of the variable stoichiometry titanium oxide allows electromigration concentration of hydrofluoric acid from the dilute solution surrounding the ceramic to levels exceeding 2 percent within the ceramic.

The sintered version of variable stoichiometry titanium oxide is about 20 percent porous by volume. Since an electrode fabricated from variable stoichiometry titanium oxide is not perfectly conducting, there will be a voltage drop between the ceramic to metal conductor interface and the ceramic surface of the electrode immersed in electrolyte. An electric field gradient will exist within the porous interior of the electrode due to current flow from the electrode circuit connection to the electrode's interface with the electrolyte. Such a field gradient will act as an ion pump causing the migration of highly corrosive acid anions through the body of a ceramic anode to the most electropositive part of the anode. This most positive region will in fact be the electrical connection to the ceramic. This connection will then be dissolved or corroded and ultimately cause electrical failure. Even nonporous EC ceramic electrodes can succumb to corrosive ions in the surrounding electrolyte. This can occur in the case of a partially immersed electrode in the region of the electrode where there is a gas-liquid interface. Again, electromigration concentration of ions can occur at this interface in the surround of the electrode and significantly alter the pH of the electrolyte in this region. A protective polymer coating of the electrode in this region can prevent degradation of the electrode in areas of elevated ion concentration.

The benefit of polymer impregnation of EC ceramics electrodes is twofold. First, many ceramic compositions that succumb to elevated concentrations of oxidizing acids can be protected by a polymer filling agent that prevents electromigration concentration. Second, the ultimate destiny of electromigrating ions is the region of the electrical connection to the electrode. It is here that they achieve the highest concentration and where a metallic interface exists which is most susceptible to attack by these ionic species. A polymer filling agent acts as a physical barrier between these ions and the metallic connection to the electrode.

Prior art does not disclose a means of impregnation of EC ceramic articles having arbitrarily small pore sizes.

Furthermore, impregnation of EC ceramics using polymers that have sufficient chemical resistance for aggressive electrochemical applications requires steps not previously disclosed. The prior art does not disclose a means of impregnation of a porous ceramic electrode with a polymer. Disclosure of polymeric coating of specific regions of solid EC ceramic electrodes for the purpose of staving off chemical attack is not present in the prior art.

SUMMARY OF THE INVENTION

The present invention is directed to a method of improving the mechanical and chemical properties of conductive ceramic electrodes and their electrical connections. A number of conductive ceramics and ceramic composites have been developed offering a range of conductivities and other properties. Electrodes made of porous varieties of these ceramics have an inherent weakness in that the porous voids of the ceramic allow infiltration by any corrosive chemical species that are in the immediate environment of the electrode. Modestly reactive chemical species can corrode the interior of such electrodes thereby reducing efficiency and leading to chemical and mechanical failure. A further disadvantage of porous electrodes is that even dilute corrosives can become concentrated within the electrode by the phenomenon of electromigration concentration. Such migration will adversely affect not only the bulk of the electrode but also the ultimate destination of the migrating corrosives, the electrical connection. One embodiment of the present invention comprises the infiltration of ceramic electrodes having interconnected porosity with polymeric formulations that are chemically resistant and can withstand the challenge of a corrosive environment. A further embodiment of the invention includes polymer encapsulation of the electrode electrical connection.

Even nonporous conductive ceramic electrodes that have relatively good chemical resistance can be adversely affected by corrosives given the voltage gradients that can exist in operational settings. A case in point is an electrode that is connected to a source of voltage and that is partially immersed in a chemically active solution. In this case, electromigration concentration of corrosive species can occur at the "waterline" in the fluid surrounding the electrode. This can cause the electrode not only to lose its conductivity in the region of the waterline, but also to be cut apart at the waterline by the action of such increased corrosive concentration. An embodiment of the present invention protects relatively nonporous conductive ceramics by selective coating of such electrodes with chemically resistant polymers to prevent degradation of the electrode in regions likely to experience increased corrosive concentration.

Impregnation of the ceramic electrodes with polymeric materials can be achieved by one of four methods. In the first, a chemically resistant polymer is dissolved in a solvent forming a solution having a high solute percentage. This solution can be infiltrated in various ways into the porous ceramic and the solvent caused to evaporate leaving a polymer coating deposited within the ceramic.

In a second method, impregnation of the interconnected porosity of the ceramic is achieved using a solid polymer-forming liquid. The process of impregnation includes evacuation of the pores of the ceramic by vacuum and potentially thermal means, pressurized infiltration of the ceramic with a solid polymer-forming liquid, and subsequent curing of the liquid in situ to form a solid polymer component.

The use of molten thermoplastic polymers comprises yet a third method. Once evacuation of the ceramic pores is achieved, pressurized infiltration of the surface region of the ceramic by the molten thermoplastic is accomplished. The resulting thermoplastic coating of the electrode penetrates to some depth within the porous ceramic. After the thermoplastic coating is allowed to harden, enough of the thermoplastic is removed by machining to expose a ceramic surface having plastic filled voids.

In a final method, the polymer is electrodeposited within the voids of the ceramic. The molecular species of many polymers are polar and as a result can be caused to electromigrate under the influence of a voltage gradient in the same way the ionic corrosives do. This fact can be exploited in the electrodeposition of such polymers into the interior of a porous EC ceramic electrode.

The chief objective of such polymer infiltration is to alter the chemical resistance of host ceramic electrode. Side benefits can include improved durability to frictional wear and improved mechanical strength.

Special consideration is given to the category of porous sintered ceramics formed from conductive compounds. These can be used as electrode materials in corrosive environments if the porosity is sealed off by a chemically inert polymer and surface processing allows the external surface of such impregnated ceramics to maintain electrical contact with the intended operational environment.

The following terminology is used in the specification and the claims. Definition of this terminology serves to clarify the invention as disclosed and claimed herein:

"Solid polymer-forming liquid" is defined as one of three categories of liquids that can be processed to form a solid polymer; the first category is that of a polymer precursor that is cured to solid form by polymerization reactions, the second category is that of a solution of solid polymer dissolved in solvent that produces a solid polymer by evaporation of the solvent component, and the third is that of molten thermoplastic polymers.

"Conductive ceramic" refers to electrically conductive ceramics that are (a) single chemical compound electrically conductive ceramics, or (b) doped ceramics that include conductive dopants such as rare earth metals, or (c) composite ceramics that include more than one chemical compound.

"Polymer protectant" refers to a polymeric material used for the purpose of creating a physical barrier between electrically conductive ceramic material and corrosive ionic species present in the solution that surrounds an electrically conductive ceramic electrode in its operational environment.

"EC ceramic electrode" refers to an electrode that is constructed so that an electrically conductive ceramic is in contact with the intended electrochemical environment of the said electrode. This includes electrodes that comprise metal substrates coated with electrically conductive ceramic coatings or electrodes that are made completely from one or more electrically conductive ceramics with the exception of the electrical connection to the electrode.

"Contents of porous voids" refers to gases such as air contained within the pores of a porous electrically conductive ceramic as well as adsorbed impurities such as water found on the ceramic interface to such voids.

"Vacuum" refers to a pressure level significantly below atmospheric pressure.

"Overpressure" refers to a pressure level significantly above atmospheric pressure.

"Chemically inert gas" is defined as a gas that has no significant chemical interaction with the ceramic or solid polymer-forming liquid.

"Infiltration" and "impregnation" are used interchangeably to mean at least the partial permeation of a porous ceramic article with a solid polymer-forming liquid by way of the pores in the external surfaces of the ceramic article.

"Processing" in the context of forming a solid polymer, refers either to any of a number of means for curing a polymer precursor to a solid polymer or to means for removal of a polymer solvent from a solution of polymer and polymer solvent.

"Electrical contact" refers to physical contact for the purpose of conducting electric current.

"Conductively adhered" refers to the use of an electrically conductive adhesive in fastening together two electrically conductive surfaces.

"Interior porosity" refers to the porous volume of a ceramic electrode that resides below the exterior surface of the electrode.

OBJECTS AND ADVANTAGES

Several objects and advantages of the present invention are:

(a) to provide improved chemical and mechanical properties to electrically conductive ceramics having interconnected porosity;

(b) to provide means of impregnating porous electrically conductive ceramics with chemically resistant polymers;

(c) to provide means of protecting solid electrically conductive ceramic electrodes from localized concentrations of corrosives;

(d) to provide electrically conductive ceramic electrodes which are resistant to highly corrosive environments;

(e) to provide a barrier to the electromigration concentration of corrosive ionic species within porous electrically conductive ceramic electrodes;

(f) to provide a highly reliable electrical connection to electrically conductive ceramic electrodes in a corrosive environment.

BRIEF DESCRIPTION OF THE DRAWINGS

In the drawings, closely related figures have the same number but different alphabetic suffixes.

FIG. 6b is a pictorial diagram providing a magnified view of a chemically protected electrode from the cell of FIG. 6a.

DETAILED DESCRIPTION OF THE INVENTION

Figure 1:
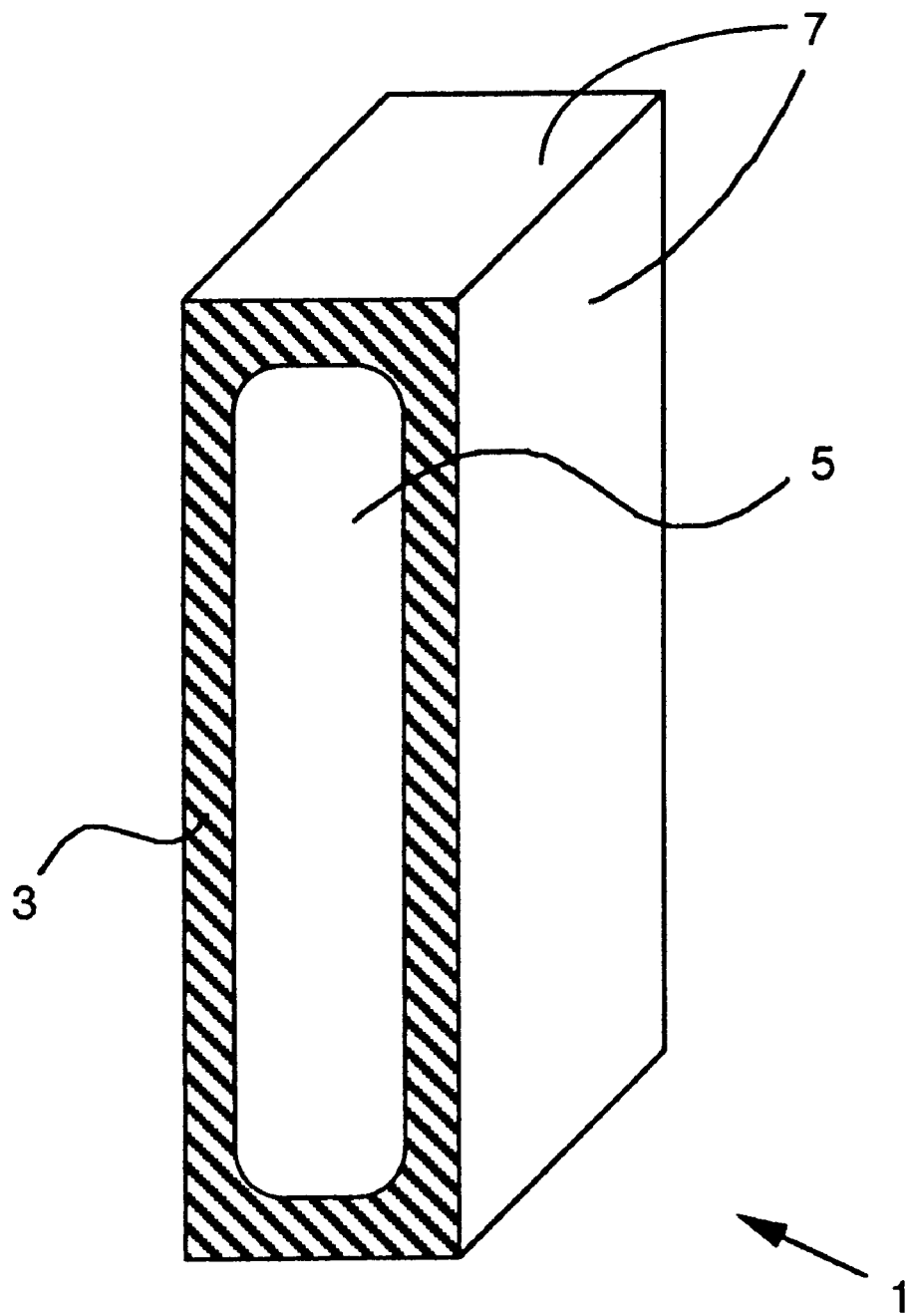
FIG. 1 is a cross-sectional view of a porous ceramic slab impregnated with polymer.

The present invention makes use of EC ceramics and various polymers to form an electrode system that is robust to attack from corrosive constituents of the operational environment. Both porous and nonporous EC ceramic electrodes can benefit from protection by polymeric materials. In the case of porous EC ceramics, impregnation of interconnected porosity by chemically resistant polymers prevents internal degradation of the electrode. Solid or nonporous EC ceramic electrodes can be protected by coating selected regions of the exterior surface with the aforementioned polymers. These are regions susceptible to localized external concentration of corrosives caused by voltage gradients present during operation of the electrode.

Electrically conductive ceramics

The general category of ceramic materials comprises inorganic compounds that are manufactured at high temperature or can be used at high temperature. Porous and nonporous varieties of bulk examples of these materials can be formed by sintering or hot pressing. Porous ceramic coatings can be formed by plasma spraying. A simple taxonomy for EC ceramics comprises single species, composite, and doped ceramics. A separate category is that of ceramic superconductors that are rather electrically insulating at room temperature. Single species EC ceramics comprise those ceramics that are made from a single EC chemical compound. There are very few single species ceramics that exhibit large values of electrical conductivity. Composite EC ceramics contain more than one chemical compound. This includes the combination of EC and nonconductive compounds or the combination of two or more EC compounds. Doped EC ceramics comprise non- or weakly-electrically conductive ceramics that are doped with materials that are highly electrically conductive, such as metals or certain metallic oxides. Ceramic superconductors are variants of cuprate and bismate ceramics that undergo transition to superconductive behavior at temperatures close to that of liquid nitrogen.

Certain of the refractory metal and semi-metal oxides, silicates, borides, carbides, and nitrides exhibit some conductivity and those which do not can be doped to achieve varying degrees of electrical conductivity. Examples of single species EC ceramics include titanium suboxides, titanium and zirconium diborides, titanium nitride, carbides of titanium, boron, and silicon, certain oxides of metal (e.g., NiO), as well as lithium and manganese ferrites[5], and iron titanate[6]. The conductivities of these materials range from highly conductive to having conductivity comparable to semiconductors. One of the most highly conductive ceramics is that formed by sintering the powdered form of Magneli phase titanium suboxides. Magneli phases are members of the homologous series of the general formula $Ti_nO_{2n-1}$, where n is a number between 4 and 10. These ceramics are surprisingly corrosion resistant. Porous versions of this material have mean pore sizes on the order of 1 micron in diameter.

Composite EC ceramics include combinations of materials having various levels of intimacy among the chemical constituents ranging from compressed or sintered mixtures to solid solutions. Examples of such ceramics include combinations of bismuth oxide and yttria stabilized zirconia[7], niobium carbide and titania or zirconia[8], nitrides of titanium and aluminum[9], nitrides of silicon and zirconium[10], nitrides of silicon and titanium[11], zirconium diboride and silicon carbide/carbon[12], refractory oxides and indium or tin oxide[13], zirconia solid solutions and oxides of neodymium, cerium, dysprosium or erbium[14], silicon nitride and silicon carbide[15], and solid solutions of strontium zirconate maganates[16].

Examples of doped ceramics include aluminum nitride made conductive by addition of transition metal oxides[17] and niobium doped strontium titanate[18]. In general, rare earths, because of their wide range of valence states, comprise dopants that are most easily incorporated into the mixed stoichiometry of many ceramics for the purpose of imparting electrical conductivity.

The range of superconducting materials covers the many series of compounds derived from the Y-Ba-Cu-O, Bi-Sr-Ca-Cu-O, Tl-Sr-Ca-Cu-O and La-Cu-O chemical families, along with numerous other variants of the cuprate and bismate materials that are known to have superconducting phases. These ceramics are largely insulating at room temperature, but transition to extremely high conductivity at critical temperatures near the temperature of liquid nitrogen. Commercially available superconducting microwave radar components and other electronic products are fabricated from these compounds.

Conductive electrodes have been used in applications exhibiting a wide variation in the corrosive nature of the operational environment. Factors affecting the strength of corrosive attack upon the electrode include temperature, voltage gradients, current density, and the type of caustic or acidic species that are in contact with the electrode. The presently disclosed invention addresses the full range of corrosive environments sustained by EC ceramic electrodes in different applications, from mild to extreme.

Examples of applications that span a range of electrochemical environments include MHD electrodes fabricated from cerium oxide doped zirconia[19], yttria stabilized zirconia-indium oxide composites[20], hafnium oxide[21], and lanthanum chromate[21]; battery electrodes that have been manufactured from nickel oxide[22], silicon carbide[23], and aluminum-alumina composites[24]; and solid oxide fuel cell electrodes comprising nickel doped zirconia[25]. Electrodes can be formed by applying EC ceramic coatings to various substrates including metals and other solid ceramics. Ceramic anodes for cathodic protection have been manufactured in this way.

Chemically-resistant polymers

Chemically resistant polymers are useful in the present invention for impregnation of porous EC ceramic electrodes, selective coating of the surface of the electrodes, and encapsulation of the electrical connections to such electrodes. Each of these uses will dictate the range of acceptable physical properties for the polymers that will be employed. For instance, high levels of polymer viscosity disfavor impregnation of ceramics but are acceptable for coating the ceramic or injection molding the polymer around the electrical connection. The level of corrosion protection required of the polymer will be dependent upon the specific electrode application. Hence, it is understood that almost all polymers have some degree of chemical resistance and the scope of the present invention therefore includes the wide range of organic polymers and the siloxane variety of inorganic fluoropolymers.

A host of polymer materials are available for use in the protection of an EC ceramic electrode. A simple taxonomy for polymers comprises (a) thermoplastics—resins that soften with heat and reharden upon cooling, (b) thermosetting resins—liquids or low-melting point solids which under the influence of energy, catalysts, or accelerators are transformed into insoluble solids, and (c) elastomers—polymeric materials that at room temperature can be stretched a significant portion of their length and upon immediate release will quickly return to their original length. Thermoplastic polymers exhibiting good chemical resistance are chlorinated polyether, polyvinylidiene fluoride, polyethylene, polyvinyl chloride, and chlorinated polyvinyl chloride. Chemically resistant thermosetting plastics include epoxy resins, furan resins, and vinyl esters. Elastomers such as chlorosulfonated polyethylene, fluoroelastomers, and polysulfide rubbers can withstand strong chemical attack as well. The scope of the present invention is not limited to use of these compounds but includes other polymers that have less chemical resistance. Such polymers can be used in electrode applications that correspond to reduced levels of corrosive activity. The formulation of the various aforementioned polymers is well known in the prior art. Many of the major commercial suppliers of polymer compounds such as DuPont, Dow Chemical and 3M provide extensive product information and application notes on the wide range of materials available. Noteworthy are the "designer polymers" that are now making their presence known in the marketplace. An example of such compounds is the category of polymers formed by controlled polymerization using metalocene catalysts. The various chemical and physical properties of these new polymers can now be fine tuned for various applications including implementations of the present invention.

An example of a solid polymer-forming liquid that is a polymer dissolved in solvent is a solution of polyvinylidene fluoride (PVDF) in a solvent combination of methyl isobutyl ketone, gamma-butyrolactone, dimethylformamide and dimethylacetamide. It must be heated to 525 degrees Fahrenheit to melt flow the PVDF in addition to driving off solvents. In addition to being highly resistant to chemical attack, this polymer resists degradation due to ionizing radiation and has been used in plutonium refining and waste treatment operations for over 25 years. At 50 percent PVDF by weight this liquid is relatively viscous. Filling efficiency is somewhat limited by the percent solids content of the solution.

The infiltration of porous EC ceramics with polymer precursors that can be cured insitu offers the advantages of lower viscosity and higher filling efficiency because all the material introduced into the porosity of the ceramic is polymerized to a solid form. Examples of solid polymer-forming liquids that are polymer precursors include the family of epoxy vinyl ester resins produced by Dow Chemical Company. The polymers produced from these formulations are remarkably resistant to organic solvents as well as a spectrum of corrosives including strongly oxidizing inorganic acids. A formulation particularly well suited for use in an electrochemical electrode is a mixture of epoxy vinyl ester resin that is 36 percent by weight styrene monomer and an organic peroxide catalyst such as the peroxyketal 1,1-bis (T-butylperoxy)3,3,5-trimethylcyclohexane produced by Atochem. Another such liquid form polymer precursor requires 100 parts dipolymer of vinylidiene fluoride and hexafluoropropylene to 30 parts of curing agent N,N'-dicinnamylidiene 1,6 hexanediamine. Upon cure, this combination produces a chemically resistant fluoroelastomer.

Because ceramics are refractory materials, the temperatures required in using molten thermoplastic impregnation do not pose a threat to the ceramic electrode. Even the lower temperature at which titanium suboxides are oxidized to titanium oxide is higher than the melting point of most thermoplastics. A more significant consideration is the post-impregnation machining of the excess plastic from the surface of the electrode. Higher melting temperatures favor the use of higher speed machining approaches.

Protection of EC electrodes

To form porous sintered ceramics, organic or carbon particles are typically mixed into a ceramic powder. Porous cavities are formed within the ceramic form after burning out and sintering. It is noted that the content of such particles should exceed 20 percent by volume if the porosity is to be interconnected[4]. If this interconnected porosity extends to the surface of the given ceramic then significant impregnation by polymer is achievable. Impregnation by the polymer can improve the mechanical and chemical properties of the ceramic. Mechanical properties of the ceramic such as strength and wearability can be largely improved by such impregnation. It is also possible to modify the chemical performance of the ceramic. In certain environments, the porous nature of these ceramics allows the infiltration of chemicals that can degrade the ceramic in an accelerated manner compared to non-porous versions of the same ceramic. This is due to the large surface area under attack and the ability of corrosives to increase in concentration within the porous geometry. It is not necessary to completely fill all accessible pores of the ceramic with a chemically resistant or impervious polymer, but rather to infiltrate the polymer some distance below the exterior surfaces of the ceramic article to form a continuous seal. Reference is made to FIG. 1, a cross-sectional view of a slab of porous ceramic 1 showing infiltration by an amount of polymer sufficient to form such a barrier seal. The polymer has been infiltrated through exterior surfaces 7 to form a polymer filled region 3 surrounding a polymer free region 5 interior to the ceramic.

Figure 2A:
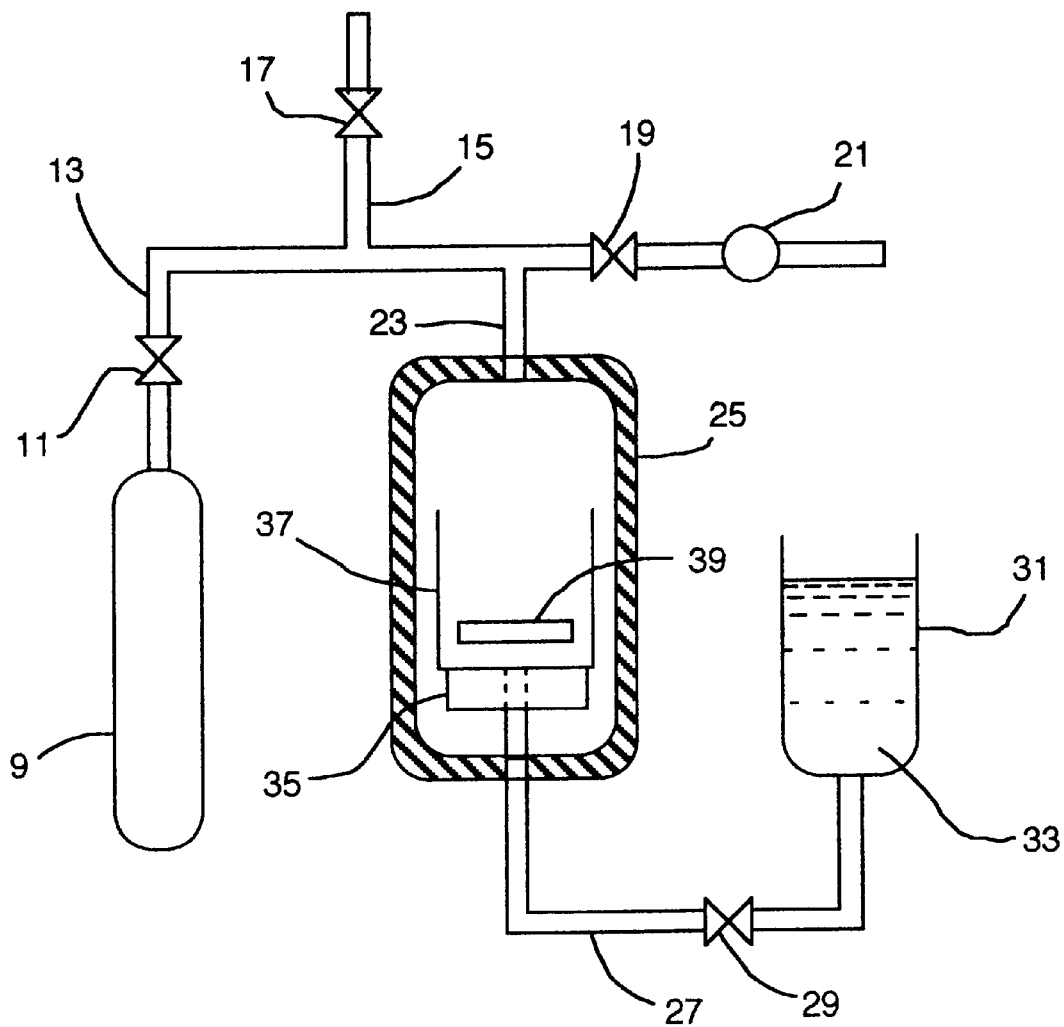
FIG. 2a is a schematic diagram of polymer impregnation apparatus prior to introduction of polymer forming liquid into pressure vessel.

The process by which polymer impregnation is achieved is pictured schematically in FIG. 2. In FIG. 2a, a high pressure vessel 9 containing a chemically inert gas at overpressure, a pressure vessel 25 containing the porous ceramic article 39, and a tank 31 containing solid polymer-forming liquid are shown vertically arranged and in juxtaposition. The tank 31 is communicated with basin 37 contained within pressure vessel 25 through pipe 27 and valve 29. High pressure vessel 9 is communicated with the top of pressure vessel 25 via pipe 13, valve 11, and pipe branch 23. Vacuum pump 21 is communicated with the top of pressure vessel 25 via pipe 13 and valve 19. Pressure relief of the system is provided by valve 17 connected to pipe branch 15. The porous ceramic article 39 is contained in basin 37.

Figure 2B:
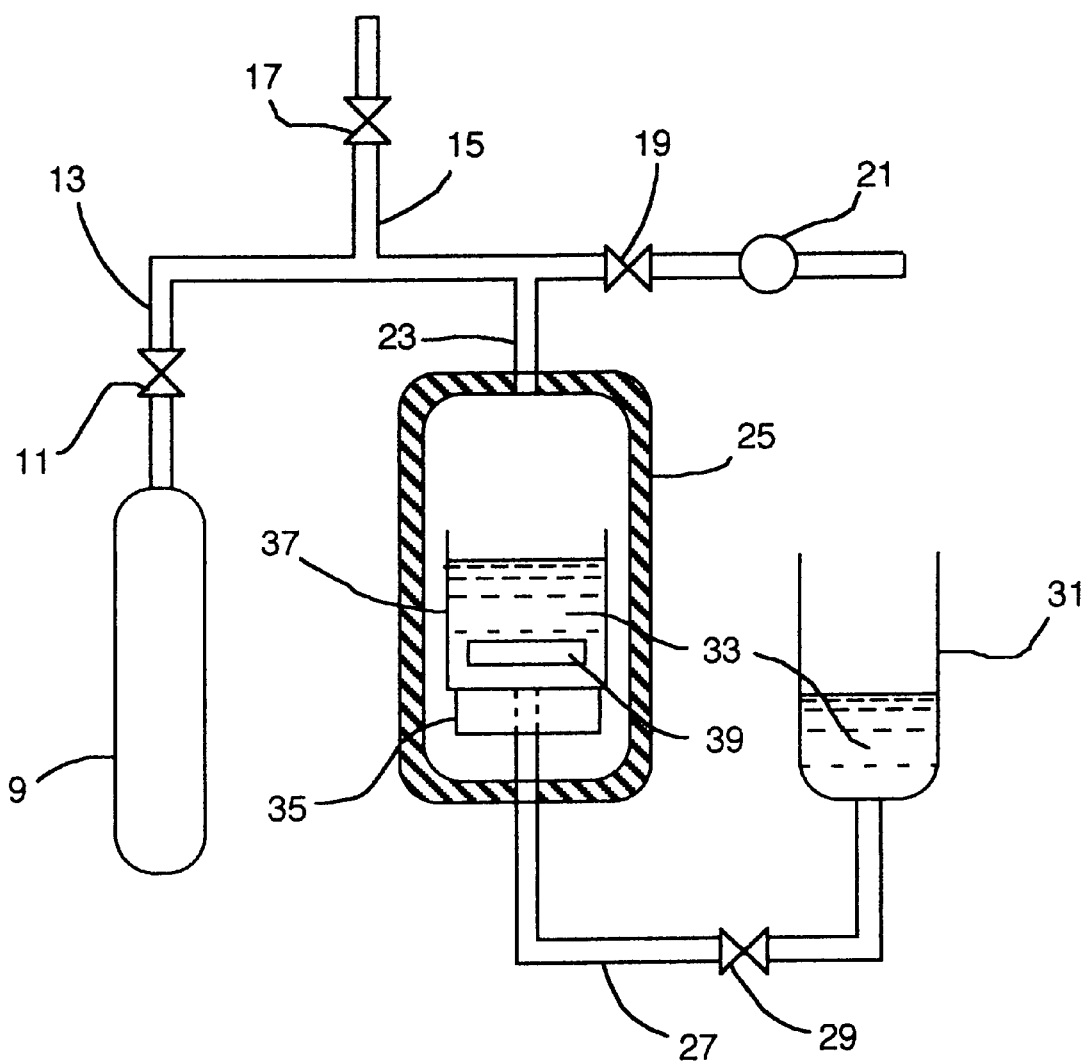
FIG. 2b is a schematic diagram of polymer impregnation apparatus subsequent to introduction of polymer forming liquid into pressure vessel.

With basin 37 containing only the ceramic article 39, all valves are closed save valve 19 and the vacuum pump 21 and heating element 35 are operated. This serves to evacuate the porosity of the ceramic 39 and drive off adsorbed impurities such as water contained by the ceramic. After sufficient impurity removal, heating is terminated and valve 19 is closed to maintain a vacuum in pressure vessel 25. Subsequent to sufficient cooling of ceramic article 39 and basin 37, valve 29 is opened to allow introduction of solid polymer-forming liquid 33 into basin 37 to surround ceramic article 39 as depicted in FIG. 2b. After ceramic article 39 is sufficiently immersed in solid polymer-forming liquid 33, valve 29 is closed and valve 11 is opened for a period of time sufficient to introduce the proper overpressure of chemically inert gas. The overpressure then drives the solid polymer-forming liquid into the porosity of ceramic article 39. At a time coincident with the desired amount of impregnation, the gas overpressure within pressure vessel 25 is relieved by opening valve 17. Ceramic article 39 is removed from pressure vessel 25 and placed in a processing chamber that causes curing in the case of a solid polymer-forming liquid 33 that is a polymer precursor or causes evaporation of solvent in the case of a solid polymer-forming liquid 33 that is a polymer dissolved in solvent. Curing of solid polymer-forming liquids is achieved by such means well known in prior art as use of heat, pressure, radiation exposure and combinations of these.

Figure 3:
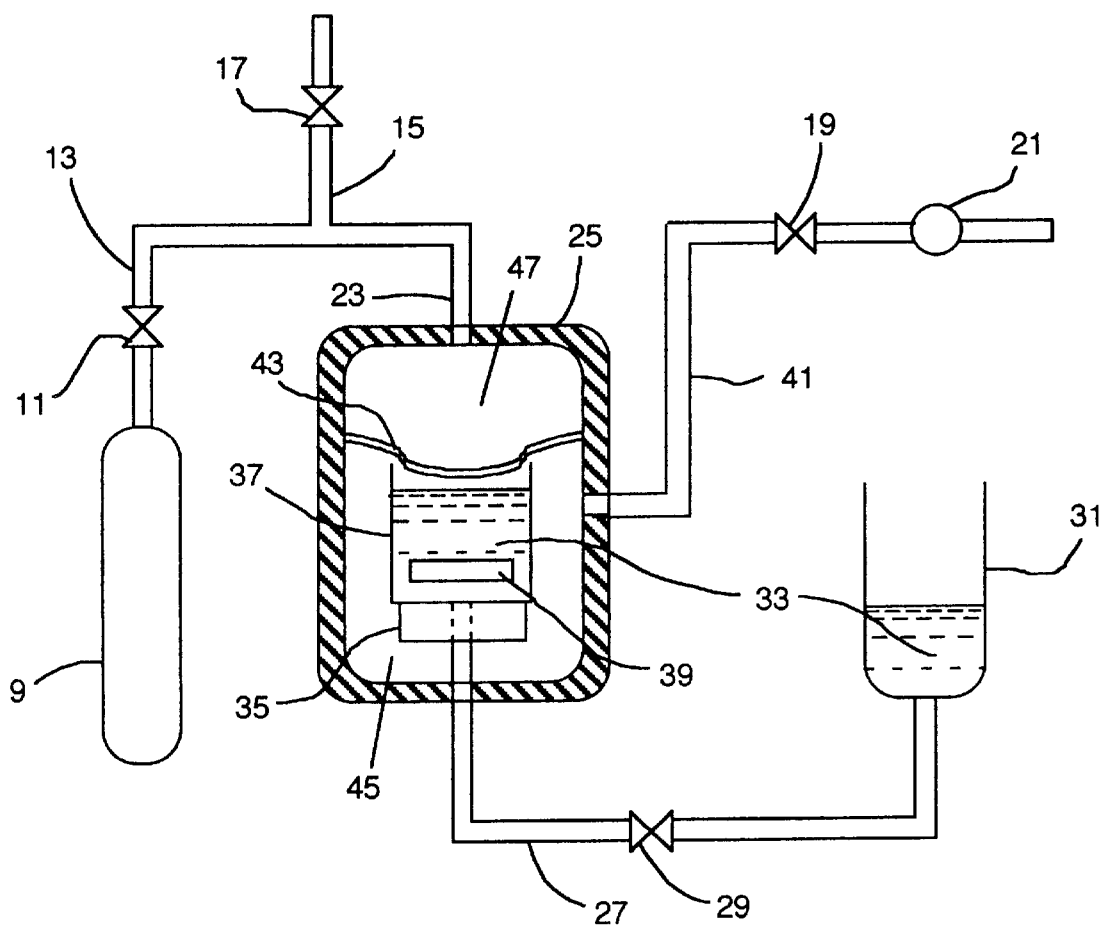
FIG. 3 is a schematic diagram of polymer impregnation apparatus modified to include a deformable pressurizing diaphragm within the pressure vessel.

Depending on the application, and impurity levels present in the ceramic article, the use of heating element 35 may be unnecessary. For applications in which solubility of the chemically inert gas in the solid polymer-forming liquid is significant a flexible diaphragm can be installed in pressure vessel 25 as shown in FIG. 3. Vacuum pump 21 is now connected via pipe 41 to the volume 45 of pressure vessel 25 contained under flexible diaphragm 43. Inert gas overpressure is introduced via pipe 13 to the volume 47 of pressure vessel 25 contained above flexible diaphragm 43. Upon pressurization of volume 47, pressure is transferred to the solid polymer-forming liquid 33 via deformation of flexible diaphragm 43 while preventing gas transfer into solid polymer-forming liquid 33.

It may be desirable to polymer impregnate only selected regions of the ceramic article. To achieve this objective, those regions of the ceramic article that are to be polymer free are first impregnated with a low viscosity, non-polymer-forming material that sets to a solid form. This liquid can be "poured" into the ceramic in desired regions. After the low viscosity liquid is allowed to set, the remaining volume of the ceramic article is then impregnated with the polymer-forming liquid. Two alternatives exist for removal of the non-polymer-forming material. The first approach requires the polymer-forming liquid to have a sufficiently large viscosity and surface tension that a solvent can be used to remove the non-polymer-forming material without disturbing the polymer-forming liquid. In which case, the polymer-forming liquid is subsequently cured. The alternative approach is to cure the polymer-forming liquid with the non-polymer-forming material in place and then to use a solvent for removal of the non-polymer material from the ceramic. For this approach, it is required that the non-polymer material withstand whatever curing procedure is used for the polymer-forming liquid.

Figure 4A:
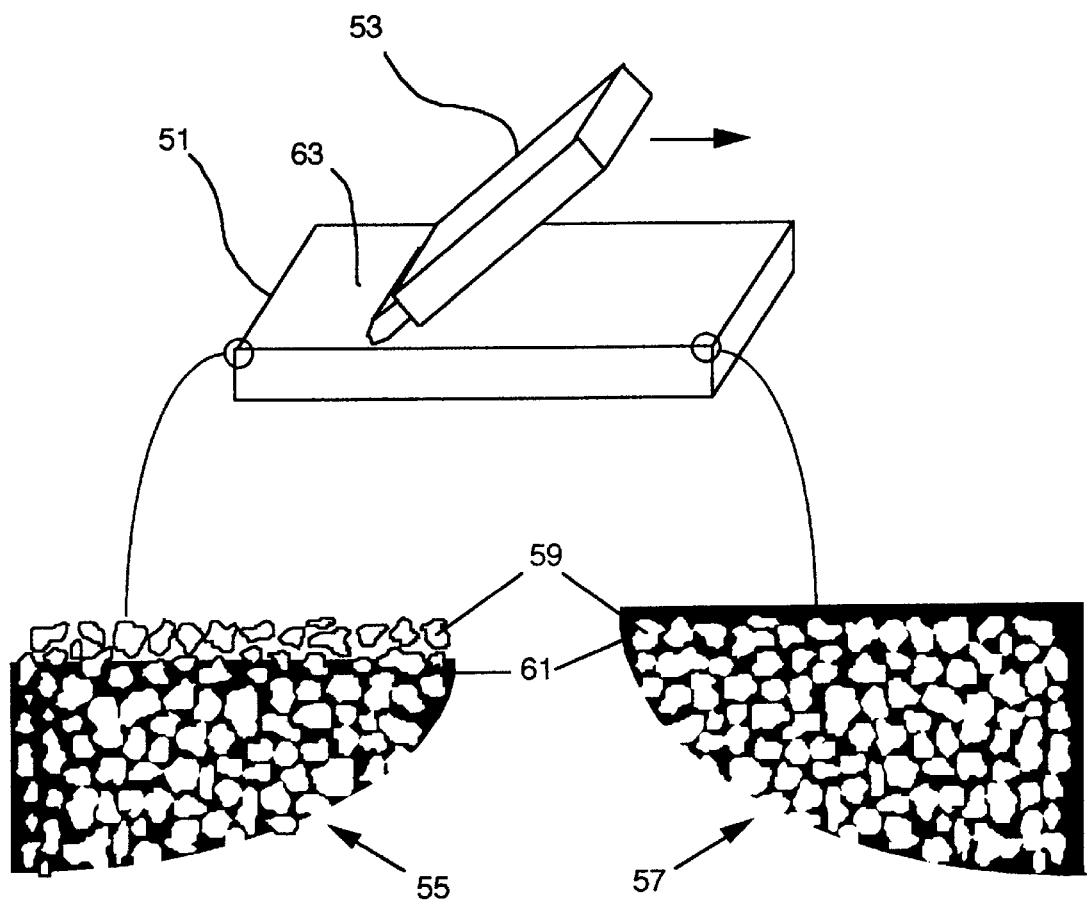
FIG. 4a is a pictorial diagram of a polymer-forming liquid impregnated ceramic electrode processed to remove the surface coating of liquid.

Impregnation of the ceramic by a chemically resistant polymer provides a seal to prevent attack of the bulk ceramic as well as the metallic conductor connection to the ceramic. In the final state, the polymer must not coat the exterior surface of the ceramic electrode so as to allow electrical contact of the electrode with its surroundings. FIG. 4a depicts an approach to achieving this requirement prior to formation of solid polymer within the ceramic. A slab 51 of ceramic impregnated with solid polymer-forming liquid is shown prior to polymerization or solvent evaporation of the liquid. A squeegee 53 is used to wipe the surface of the ceramic 51 and thereby remove the liquid that coats the surface 63. The surface before and after this process is depicted by magnified renditions of regions 57 and 55, respectively. Region 57 shows the liquid impregnate 61 fully coating the individual ceramic grains 59 and the exterior surface of the bulk ceramic. Region 55 depicts removal of the surface coating of liquid.

Use of polymer precursor liquids that shrink upon curing can provide a ceramic surface free of polymer coating. This will occur because the surface tension of the liquid will allow the liquid to be retracted from the ceramic surface upon curing. Another approach to removal of a surface coating of liquid that can be used prior to formation of solid polymer in situ is that of solvent vapor blasting. This is a well-known means of polishing plastics in which the gaseous phase of a solvent or thinning agent is blown over the surface to remove excess material. Finally, subsequent to the formation of solid polymer in situ various mechanical means of exposing the ceramic that underlies the solid polymer coating can be used. This includes grinding, sanding, lapping and/or polishing.

Numerous electrochemical applications exploit the use of porous electrodes to increase surface area for redox reactions. In many of these applications it is sufficient that the porosity of the electrode extends but a millimeter or so below the exterior electrode surface. Such a surface layer of porosity can be achieved subsequent to impregnation of the electrode with polymer-forming liquid by solvent washing of the electrode or as mentioned above, solvent vapor blasting.

Figure 4B:
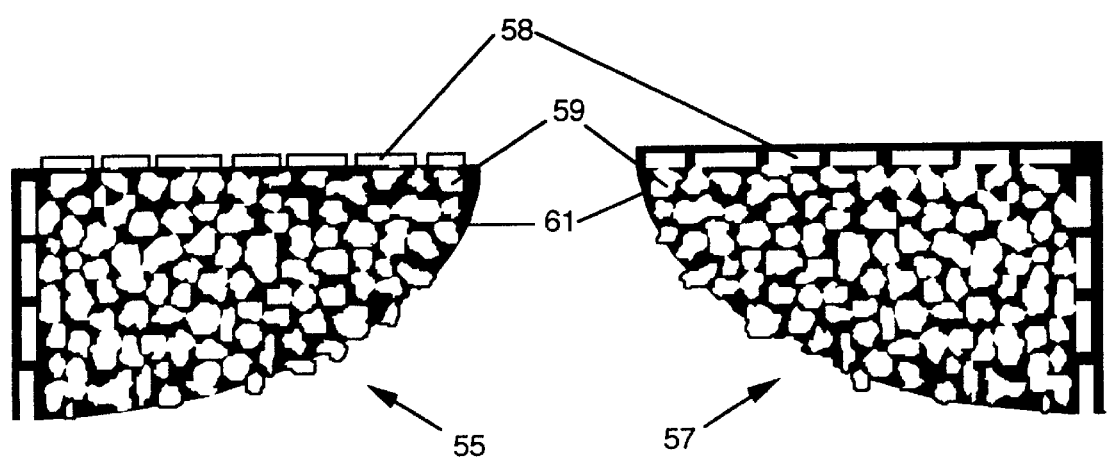
FIG. 4b is a pictorial diagram of the surface of a ceramic electrode that has a catalytic coating, is impregnated with a polymer-forming liquid, and is processed to remove the surface coating of liquid.

Certain catalytic coatings are applied to electrodes to improve redox reaction efficiencies and corrosion resistance. Among the examples typical of such coating materials are ruthenium dioxide, iridium dioxide and platinum iridium. The most popular techniques for application of these coatings to electrode substrates include spraying and electroplating. In the spraying technique, a mixture of metal chlorides and alcohol is sprayed onto the substrate and heated in the presence of oxygen. The electoplating method causes the deposition of small grains of the pure metal on the electrode that are subsequently oxidized at elevated temperature. The spraying method results in a "cracked mud" appearance of the coated electrode surface under microscopic examination—attributable to disconnected patches of oxide coating. The electoplating method can produce more uniform coating. This is especially true if pulsed electroplating is used due to the small metal grain sizes deposited. However, spraying or electroplating produce metal oxide coatings that do not fill all the surface pores of a porous ceramic substrate. For this reason, polymer impregnation of ceramic electrodes having catalytic and/or corrosion resistant coatings is of significant value. The oxidation temperatures required to form dioxides from metal precursor coatings are too high for polymers to withstand and therefore prohibit impregnation of the ceramic prior to the coating process. As a consequence, impregnation is performed subsequent to formation of the oxide coating and will require an extended duration or higher pressure to achieve infiltration given the reduced surface porosity. FIG. 4b, depicts surface regions of a ceramic slab as in FIG. 4a, but having a catalytic coating depicted by surface plaques 58. The catalytic coating is relatively mechanically durable and will withstand the processes outlined above for removal of surface polymer prior to curing of the polymer. The polymer must not be removed to a depth that will expose the ceramic underlying the catalytic coating. This can be ensured by microscopic examination of the electrode surface at various intervals in the removal process in order to calibrate the removal rate.

Figure 5A:
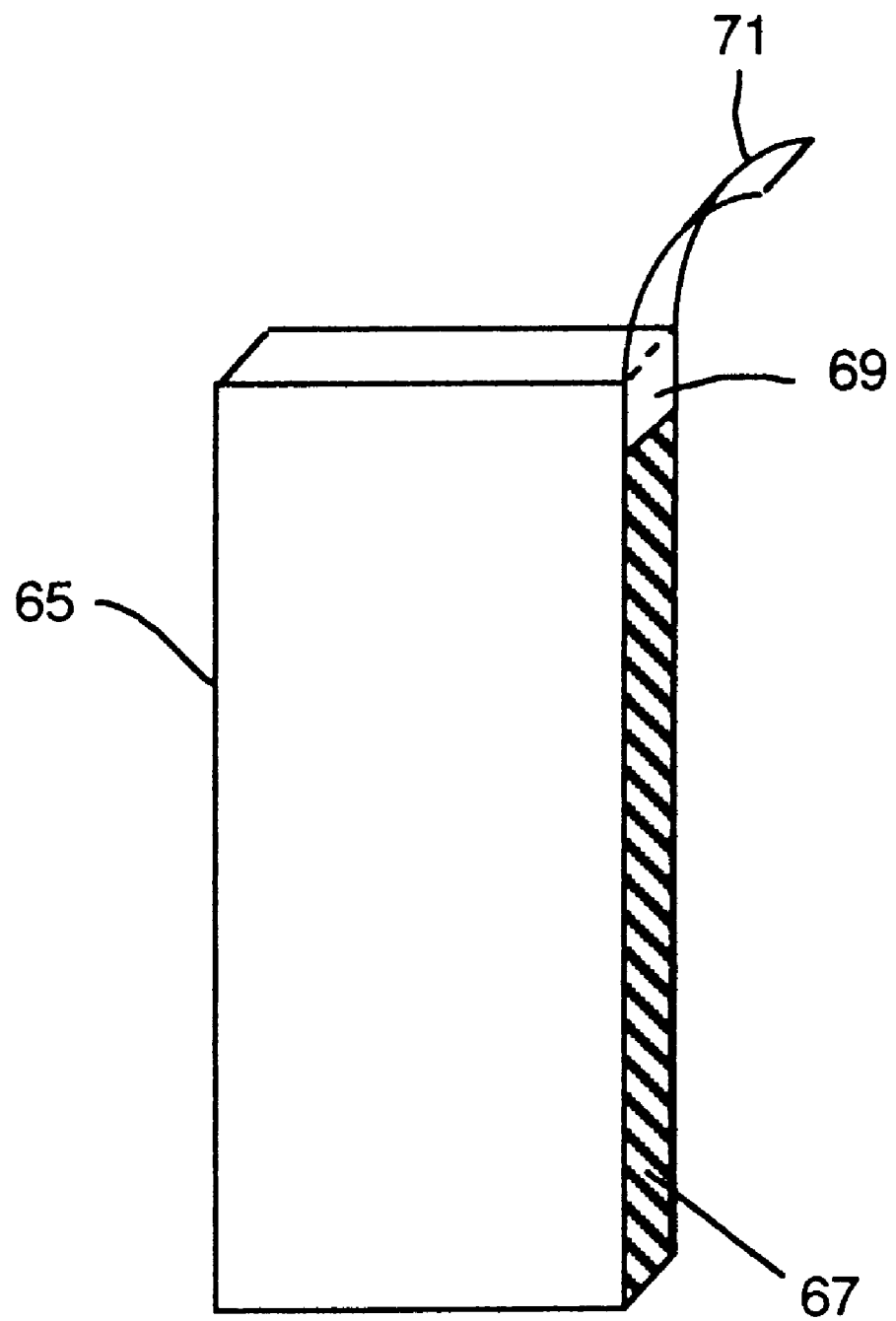
FIG. 5a is a pictorial diagram of a conductive ceramic electrode having a metal connection made prior to impregnation of the electrode.
Figure 5B:
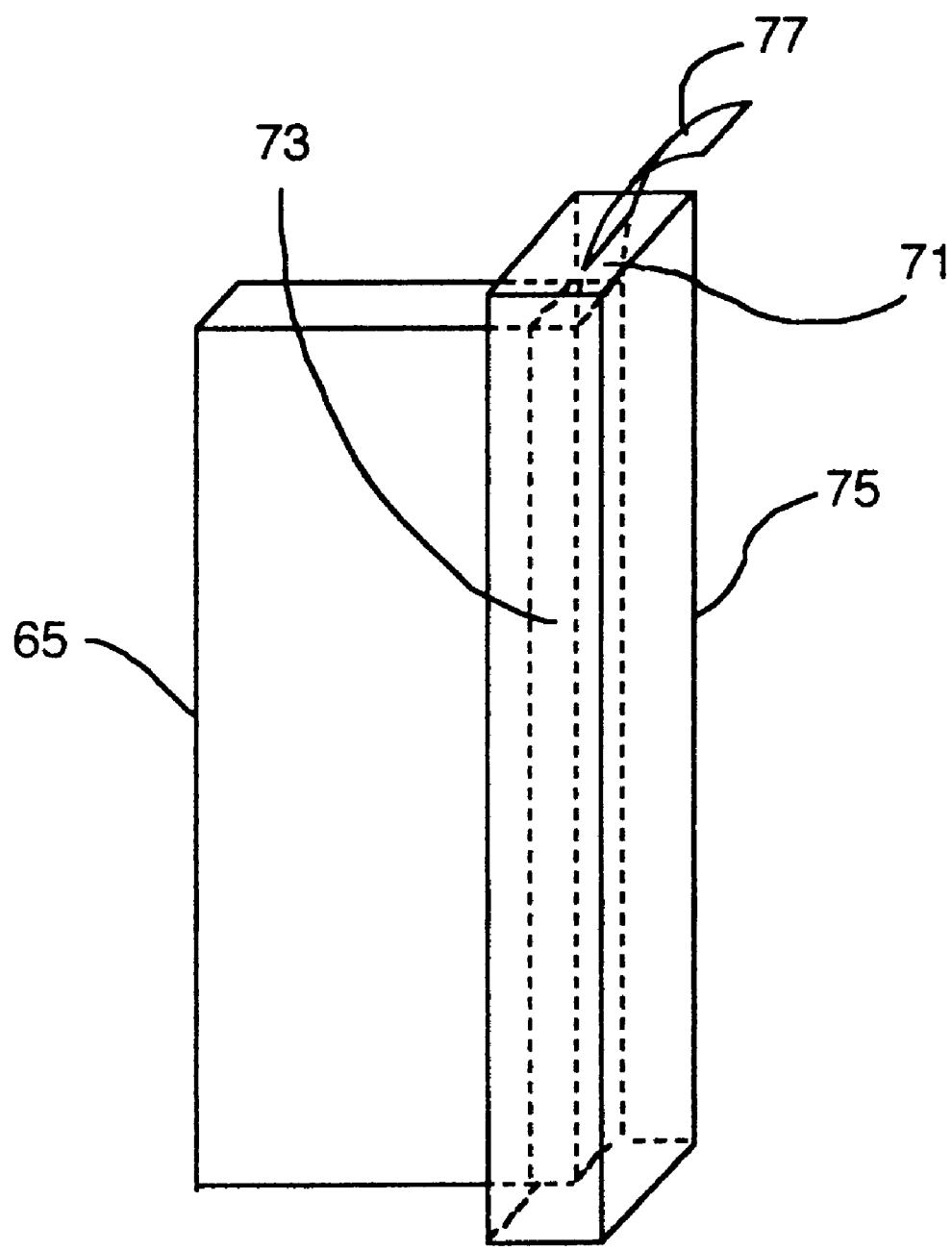
FIG. 5b is a pictorial diagram of a conductive ceramic electrode having a metal connection potted in a polymer form.

A conductive ceramic electrode is made electrically functional by providing a connection between the ceramic electrode and a metallic conductor. As depicted in FIG. 5a, this can be achieved prior to polymer impregnation of the ceramic by vacuum brazing a metal or metal alloy onto the surface 67 of the ceramic 65. Alternatively, electrodepositon means can be used for this purpose. As shown in FIG. 5a, the metal connection is placed to minimize the total electrode resistance; in this case it runs along the longest dimension of the ceramic that will be immersed in an electrochemically active environment. In concert with these methods, an additional metal strip 71 can be soldered in region 69 to the metal deposited on the ceramic to provide an extended electrical connection. A castable form surrounding the metal-ceramic connection on an impregnated electrode can be filled with solid polymer-forming liquid prior to polymerization or evaporation of the liquid. An alternative is to injection mold a thermoplastic polymer around the connection. This provides a metal-ceramic connection that is encapsulated in solid polymer. For the purpose of clarity, an exaggerated version of this concept is shown in FIG. 5b. A volume 73 of the electrode that includes the ceramic to metal connection is shown potted in a polymer form 75 with a portion 77 of the metal strip 71 available for connection to an external circuit.

A method of metallic conductor attachment subsequent to polymer impregnation is the use of conductive adhesives such as silver-filled epoxies. Mechanical strengthening and chemical protection of this form of connection can be achieved by laying up layers of fibrous polymer to surround the connection and then impregnating this assembly with polymer.

Figure 6A:
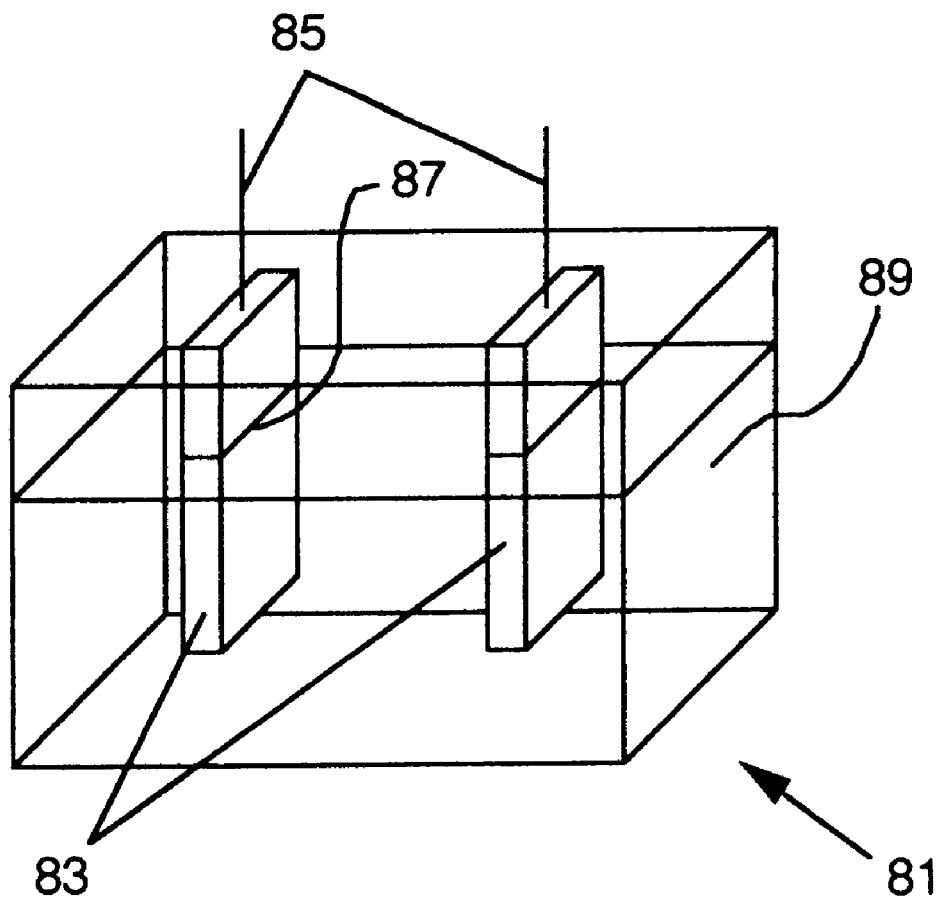
FIG. 6a is a pictorial diagram of an electrochemical cell having solid electrically conductive ceramic electrodes.
Figure 6B:
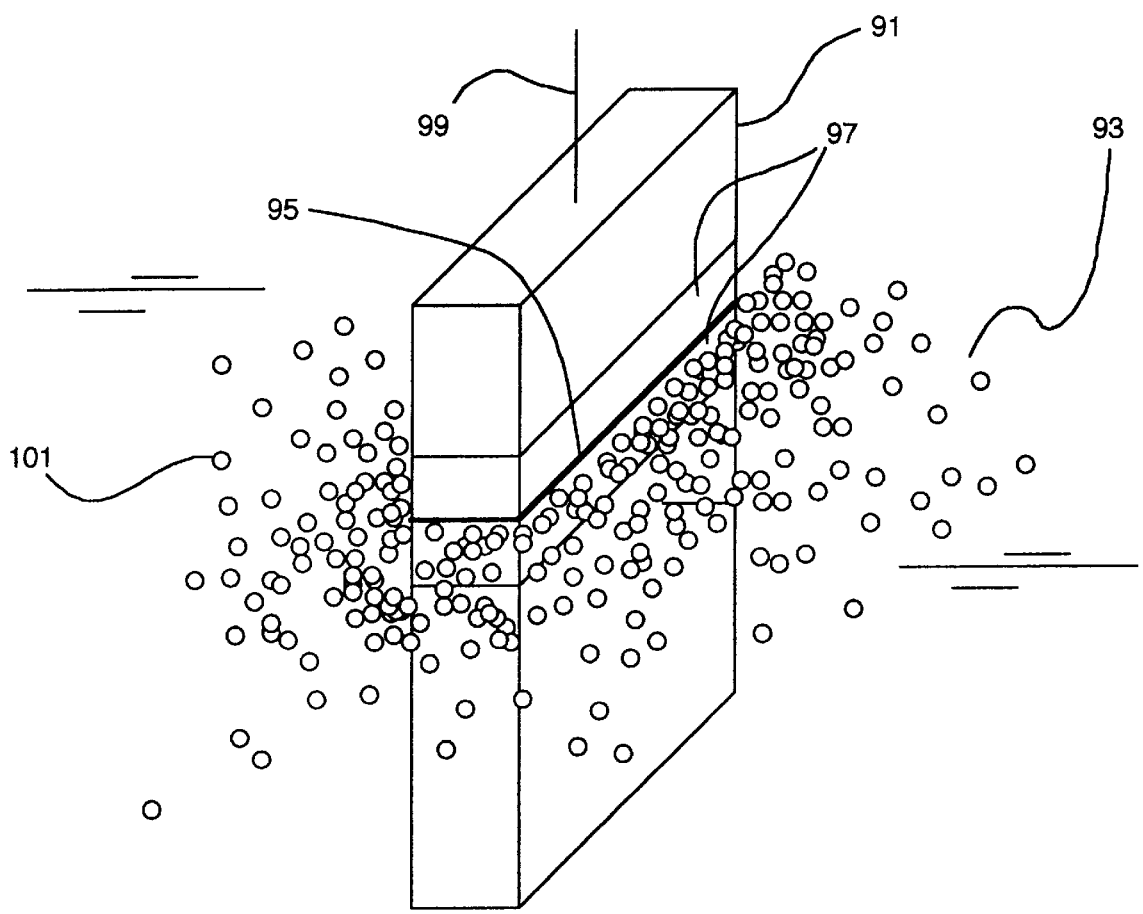

Solid EC ceramic electrodes can be protected from corrosive attack in the vicinity high corrosive concentration by coating of such electrodes. FIG. 6a depicts a cell 81 that uses solid EC ceramic electrodes 83 immersed in an electrolyte solution 89. By virtue of their electrical connections 85 to a voltage source, voltage gradients are set up which tend to concentrate ionic species at the waterline 87 surrounding the electrodes. This is depicted in the magnified view of an electrode 91 having electrical connection 99 in FIG. 6b. Ionic species depicted by small circles 101 are shown concentrating from the electrolyte 93 in the vicinity of the waterline 95 of the electrode. This concentration of corrosive species can be considerably higher than in the bulk of the fluid electrolyte 93 and can lead to chemical attack of unprotected EC ceramic surfaces. An embodiment of the present invention that addresses this phenomenon is the coating of the electrode 91 with a chemically resistant polymer 97 in the region of the electrode subject to such attack. Such coatings can be selectively applied in various geometries other than that shown to address the requirements of particular implementations.

Conclusions

The benefit of partial coating of the electrode with polymer to inhibit corrosion of various regions of the electrode and the electrode as a whole is the essence of the invention. It has been established that it is a requirement that the polymer not coat the entire electrode so as to allow electrical contact of some portion of the electrode with its chemical surround. Therefore, any benefit provided by the present invention must be accomplished by coating only a portion of the electrode. Both porous and solid ceramic electrodes can benefit from partial coating by polymer. Since electromigration concentration of corrosives is a foremost mechanism of electrode destruction, placing a barrier in the path of such corrosive migration provides a means of protecting the electrode. Such a barrier should be placed between the electrical connection and the source of such corrosives. In the case of porous electrodes, both the interior of the electrode and the electrical connection can be protected by creating a barrier seal of polymer in a layer that does not need to fully infiltrate the interior of the electrode. Also, field gradients at the waterline of immersed electrodes tend to concentrate ionic species in the solution surrounding the electrodes at the waterline. Solid and porous electrodes can be susceptible to these concentrations and hence could benefit by a polymer coating of the electrode in the region subject to attack. This protects the waterline region of the electrode from attack and maintains the functioning of the electrode as a whole.

References

1. C. Vipulanandan, S. Salib, K. Ravi-Chandar, "Performance of high temperature superconducting ceramic-polymer composite," Materials Research Bulletin, Vol. 24, No. 9, pp. 1059–67.
2. I. M. Low, F. W. Lim, "Synthesis of epoxy-modified $YBa_2Cu_3O_{7-x}$ superconductor," Journal of Materials Science Letters, Vol. 10, No. 19, pp. 1119–21.
3. F. W. Lim, Postgraduate Diploma Thesis in Applied Physics, Curtin University of Technology, Perth, Australia (1990).
4. A. J. Moulson and J. M. Herbert, "Electroceramics—Materials, Properties, Applications," Chapman and Hall, New York, N. Y., 1992.
5. J. H. Boy, M. Olson, V. F. Hock, A. Kumar, "Improved ceramic anodes for corrosion protection", Final Report, Army Construction Engineering Research Lab., November 1984.
6. V. F. Hribar, J. L. Bauer, T. P. O'Donnell, "Electrically conductive, black thermal control coatings for spacecraft applications. III—Plasma-deposited ceramic matrix," Proceedings of the Thirty-second International SAMPE Symposium and Exhibition, Anaheim, Calif., Apr. 6–9, 1987.
7. Y. H. Kim, H. G. Kim, "The effect of Bi/sub 2/O/sub 3/ on the microstructure and electrical conductivity of ZrO/sub 2/-Y/sub 2/O/sub 3/ ceramics," J. Mater. Sci. Mater. Electron. (UK)., Vol. 5, No. 5, pp. 260–6, October 1994.
8. T. Matsuo, E. Oshima, S. Tomishige, H. Hayakawa, H. Kitao, "Wire electrodischarge machining of the conductive zirconia ceramics," J. Jpn. Soc. Precis. Eng. (Japan). Vol. 58, No. 3, pp. 477–82, 1992.
9. I. Kimura, N. Hotta, K. Ichiya, N. Saito, "Synthesis of TiN-Al/sub 2/O/sub 3/composite powder by floating-type fluidized-bed CVD," Nippon Seramikkusu Kyokai Gakujutsu Ronbunshi (Japan), Vol. 97, No. 12, pp.1525–9, 1989.
10. Y. Yasutomi, M. Sobue, Y. Kubo, "Development and characterization of electroconductive Si/sub 3/N/sub 4/ bonded ZrN ceramics," Nippon Seramikkusu Kyokai Gakuiutsu Ronbunshi (Japan), Vol. 97, No. 7, pp. 721–7, 1989.
11. O. Nishikawa, M. Tomitori, "Scanning tunneling microscopy study of conductive ceramics," J. Vac. Sci. Technol. A. Vac. Surf. Films (USA), Vol. 6, No. 2, pp. 454–6, March–April 1988.
12. J. W. Maccalous, W. P. Coppfer, "Electrical discharge machining of zirconium diboride," AIAA, ASME, and SAE, Structures, Structural Dynamics, and Materials Conference, 13th, San Antonio, Tex., Apr. 10–12.
13. D. D. Marchant, "Ceramic materials for MHD electrodes," Presented at 22nd Symp. on Engr. Aspects of MHD, State College, Miss., 24 Jun. 1984.
14. C. Pascual, J. R. Jurado, P. Duran, "Electrical behavior of doped-yttria stabilized zirconia ceramic materials," Journal of Materials Science. Vol. 18, pp. 1315–1322, May 1983.
15. A. A. Kas'ianenko, L. A. Shipilova, E. I. Gervits, "Structure and electrophysical properties of hot-pressed ceramic materials in the system Si3N4-SiC. II—Electrical conductivity of materials in the context of conductivity theories for heterophase systems," Poroshkovaia Metallurgiia, No. 8, pp. 86–90, August 1992.
16. H. W. King, J. G. Murphy, K. M. Castelliz, "Electrical resistivity and high temperature stability of zirconate-manganate ceramics," High Temp. Sci. (USA), Vol. 23, No. 3, pp. 157–71, June 1987.
17. M. Kasori, F. Ueno, A. Tsuge, "Effects of transition-metal additions on the properties of AlN," J. Am. Ceram. Soc. (USA), Vol. 77, No. 8, pp. 1991–2000, August 1994.
18. G. C. Sung, P. F. Johnson, "Electrical properties of air-fired Nb-doped SrTiO/sub 3/ with excess titania", Ferroelectrics (UK), Vol. 132, No. 1–4, pp. 115–27, 1992.
19. P. Fassina, M. Capra, M. Zanotti, C. Luzzatto, C. Mao, "Preparation of ceramic materials and elements for super-hot MHD electrodes," Eleventh International Conference on Magnetohydrodynamic Electrical Power Generation, Beijing, China, 12–16 Oct., 1992.
20. E. S. Lukin, V. S. Koziovsky, V. I. Zalkind, V. K. Shikov, T. V. Safronova, "Electrode elements based on ceramic composites with enhanced thermal shock resistance and electrical conductivity for MHD-generators," Eleventh International Conference on Magnetohydrodynamic Electrical Power Generation, Beijing, China, 12–16 Oct., 1992.
21. J. W. Hafstrom, J. T. Dusek, "Fabrication and testing of MHD electrodes containing an integral leadout/attachment system," Proceedings of the 17th Symposium on the Engineering Aspects of Magnetohydrodynamics, Stanford, Calif., 1978.
22. G. H. Kucera, A. P. Brown, "ANL's development of conductive ceramic components for MCFC," Presented at the Morgantown Energy Technology Center Contractors Review Meeting, 5–6 Jan., 1991.
23. R. R. Dubin, S. Prochazka, "Evaluation of sintered SiC as an electrode and container material in sodium/sulfur cells," Electrochemical Society Journal, Vol. 126, pp. 2156–2159, December 1979.
24. K. Zdunek, "Synthesis of Al/sub 2/O/sub 3/ condensates from impulse plasma," Third International Conference on Plasma Surface Engineering, GarmischPartenkirchen, Germany, 26–29 Oct., 1992.
25. M. Hrovat, J. Holc, "Ceramic materials for solid oxide fuel cells—an overview," Elektroteh, Vestn. (Slovenia), Vol. 61, No. 5, pp. 292–306, 1994.

What is claimed is:

1. A chemically-protected electrode assembly comprising:
   (a) an electrically conductive ceramic electrode which may be deleteriously affected by chemical corrosion when said electrode is subjected to a corrosive environment;
   (b) a polymer chemically resistant to said corrosive environment and;
   (c) a coating of said polymer on a less than entire portion of said electrode to inhibit corrosion of said electrode.

2. The chemically-protected electrode assembly according to claim 1 in which said electrode is formed from a single species electrically conductive ceramic material.

3. The chemically-protected electrode assembly according to claim 1 in which said electrode is formed from a combination of different electrically conductive ceramic materials.

4. The chemically-protected electrode assembly according to claim 3 in wherein said different electrically conductive ceramic materials consist of Magneli phase suboxides of titanium.

5. The chemically-protected electrode assembly according to claim 1 in which said electrode is formed from electrically conductive doped ceramic materials.

6. The chemically-protected electrode assembly according to claim 1 in which said polymer comprises thermoplastic material.

7. The chemically-protected electrode assembly according to claim 1 in which said polymer comprises thermosetting resin.

8. The chemically-protected electrode assembly according to claim 1 in which said polymer comprises an elastomer.

9. The chemically-protected electrode assembly according to claim 1 in which said electrode is coated with a catalytic coating.

10. The chemically-protected electrode assembly according to claim 9 in which said coating is from the group consisting of indium dioxide, ruthenium dioxide, and platinum iridium.

11. The chemically-protected electrode assembly according to claim 1 which further includes in combination therewith, means for attachment of said electrode to a voltage source and a coating of a chemically resistant polymer upon said means for attachment.

12. The chemically-protected electrode assembly according to claim 11 in which said means for attachment of said electrode to said voltage source includes a vacuum brazed electrical connection.

13. The chemically-protected electrode assembly according to claim 11 in which said means for attachment of said electrode to said voltage source includes an electrical connection formed by electroplating.

14. The chemically-protected electrode assembly according to claim 11 in which said means for attachment of said electrode to said voltage source includes an electrical connection formed by electrically conductive adhesive.

15. The chemically-protected electrode assembly according to claim 1 wherein said electrode defines porosity which is at least partially coated with said polymer.

16. The chemically-protected electrode assembly according to claim 15 which further includes in combination therewith, means for attachment of said electrode to a voltage source and a coating of chemically resistant polymer upon said means for attachment.

17. The chemically-protected electrode assembly according to claim 16 wherein said polymer coatings of said electrode and said means for attachment together form an integral barrier seal enveloping said means for attachment and the region of said electrode immediately proximate said means for attachment.

18. The chemically-protected electrode assembly according to claim 15 wherein said polymer is present in a layer which seals the interior porosity of said electrode against the intrusion of said corrosive environment.

19. The chemically-protected electrode assembly according to claim 15 wherein said electrode is coated with a catalytic coating.

20. The chemically-protected electrode assembly according to claim 19 wherein said catalytic coating is from the group consisting of indium dioxide, ruthenium dioxide, and platinum iridium.

21. The chemically-protected electrode assembly according to claim 15 wherein the external surface of said electrode is uncoated with said polymer so as to provide increased surface area in redox reactions.

22. The chemically-protected electrode assembly according to claim 21 wherein said electrode is coated with a catalytic coating.

* * * * *